United States Patent
Mori et al.

(10) Patent No.: US 7,284,783 B2
(45) Date of Patent: Oct. 23, 2007

(54) STORAGE STRUCTURE OF A VEHICLE ROOF

(75) Inventors: Shinji Mori, Higashihiroshima (JP); Koji Sumita, Higashihiroshima (JP)

(73) Assignee: Webasto AG, Stockdorf (DE)

( * ) Notice: Subject to any disclaimer, the term of this patent is extended or adjusted under 35 U.S.C. 154(b) by 81 days.

(21) Appl. No.: 11/110,722

(22) Filed: Apr. 21, 2005

(65) Prior Publication Data
US 2005/0242613 A1 Nov. 3, 2005

(30) Foreign Application Priority Data
Apr. 28, 2004 (JP) ............................. 2004-132897

(51) Int. Cl.
*B60J 7/00* (2006.01)

(52) U.S. Cl. .................................. 296/108; 296/107.18

(58) Field of Classification Search ........... 296/107.08, 296/107.16, 107.17, 107.18, 107.2, 107.19, 296/24.44, 37.16, 108
See application file for complete search history.

(56) References Cited

U.S. PATENT DOCUMENTS

| 6,364,396 | B1 | 4/2002 | Hayashi et al. | |
|---|---|---|---|---|
| 6,863,333 | B2 * | 3/2005 | Heller et al. | 296/107.09 |
| 6,871,901 | B2 | 3/2005 | Stenvers et al. | |
| 7,093,885 | B2 * | 8/2006 | Guillez et al. | 296/107.08 |
| 2004/0036312 | A1 * | 2/2004 | Eichholz et al. | 296/107.08 |

* cited by examiner

*Primary Examiner*—Dennis Pedder
*Assistant Examiner*—Melissa A Black
(74) *Attorney, Agent, or Firm*—David S. Safran (57) ABSTRACT

A storable vehicle roof structure having an upper roof component for covering an area above seats in a vehicle interior compartment, a rear roof component coupled to the upper roof component at a rear side thereof so as to cover a rear portion of the vehicle interior compartment, and a package tray which covers the top of a rear storage space in the closed position of the roof. The rear side of the package tray is fitted on the rear roof component via a rotary mechanism for rotating at least the front side of the package tray. The front side of the package tray is guided by a guide member to enable the package tray together with roof components to be stored in the storage space for exposing the vehicle interior compartment.

9 Claims, 7 Drawing Sheets

STORAGE STRUCTURE OF A VEHICLE ROOF

BACKGROUND OF THE INVENTION

1. Field of Invention

The present invention relates to a storage structure of a vehicle roof which can be opened and closed so as to be stored in a storage space arranged in an area behind the seats, and more specifically, relates to a storage structure of a vehicle roof comprising a package tray which covers the top of the storage space.

2. Description of Related Art

A vehicle comprising a roof which can be opened and closed has been conventionally known (Japanese Patent Application No. 2001-113952 ). The roof of such a vehicle comprises an upper roof component covering an area above seats in the vehicle interior compartment, a rear roof component covering a back area of the vehicle interior compartment and a linkage mechanism to connect the upper roof component with the rear roof component. These upper and rear roof components move between their closed position, where the vehicle interior compartment is covered, and their open position, where the vehicle interior compartment is exposed. Furthermore, the components are configured such that they are stored in a storage space when they are in their open position. In such a structure in which the upper and rear roof components are stored in the storage space, the storage space becomes vacant when the both roof components are brought to their closed position and some articles may fall into it. The falling of articles into the storage space is prevented by installing a package tray which covers an area above the storage space.

Such a package tray as mentioned above may interfere with the traveling of the upper and rear roof components when they move from their closed position to the storage space. The known package tray is configured to be movable by installing an electric motor, gear box, etc., behind the package tray and it is moved when the both roof components are brought into the storage space so as to prevent the package tray from interfering their traveling (see, Japanese Patent Application No. 2001-113952, the $3^{rd}$ page, drawings 1, 9 and 11)

Because the package tray of Japanese Patent Application No. 2001-113952 is moved by an electric motor, gear box, etc., the package tray moving structure becomes complicated and costly. Moreover, the vehicle compartment and luggage compartment will be small due to a space required for installing the motor and the like.

SUMMARY OF THE INVENTION

The present invention has been devised in consideration to the points as mentioned above and its primary objects include devising of a package tray that can be stored in a storage space by making use of the movement of roof components during the storing process so that the movement of the package tray does not interfere with the transfer of the roof components and providing a roof structure that is simplified and results in reduced costs and sufficient space for the vehicle compartment and luggage compartment.

In order to achieve the indicated objects, in accordance with the invention, the rear side of a package tray is fitted on a rear roof component and a rotary mechanism for rotating at least the front side of the package tray is provided in the package tray so as to guide at least the front side of the package tray by a guide member to enable the package tray together with roof components to be stored into a storage space.

The embodiment relates more specifically to a storage structure of a vehicle roof comprising a package tray, in which an upper roof component for covering an area above seats in a vehicle compartment and a rear roof component coupled to the upper roof component to be located in a rear side thereof so as to cover a rear side of the vehicle compartment are operatively configured such that they are movable between their closed position, where they cover the vehicle compartment, and their open position, where they are stored in a storage space arranged in an area behind the seats, to expose the vehicle compartment, and the package tray is arranged to cover the top of the storage space when the upper roof component and the rear roof component are in their closed position.

Furthermore, the package tray is operatively coupled at its rear side with the rear roof component so as to be stored into the storage space by a storing motion of the rear roof component; the package tray is provided with a rotary mechanism for rotating at least the front side of the package tray relative to the rear roof component about an axis extending in the vehicle width direction; and a guide member is further provided for rotating and guiding at least the front side of the package tray with respect to the vehicle about the axis of the rotary mechanism so as to prevent the package tray from interfering with the movement of the upper roof component and the rear roof component when they are moved from the closed position to the open position.

According to the structure, the top of the vehicle compartment is covered by the upper and rear roof components when they are brought to their closed position, and the top of the storage space which becomes vacant is covered by the package tray so as to prevent some articles from falling into it. On the other hand, when the upper roof component and the rear roof component are moved from the closed position to their open position, the package tray moves in engagement with the movement of the rear roof component as the rear side of the package tray with respect to the vehicle is fitted on the rear roof component so that the package tray is, together with the upper roof component and the rear roof component, stored in the storage space.

When the package tray is stored, at least the front side of the package tray is guided by the guide member and rotates about the axis of the rotary mechanism so that it is possible to prevent the package tray from interfering with the movement of the upper roof component and the rear roof component when the package tray is stored into the storage space.

According to the invention, the structure can be configured such that the guide member is disposed in the storage space at the upper front side thereof and has a support surface for supporting the package tray from beneath at the front side thereof with respect to the vehicle, when the upper roof component and the rear roof component are in their closed position, wherein the support surface extends downward so as to come into contact with the package tray at the front side thereof with respect to the vehicle and to guide it into the lower side of the storage space, as the upper roof component and the rear roof component are moved from their closed position to their open position.

According to the structure, the front side of the package tray is supported by the support surface of the guide member, when the upper roof component and the rear roof component are brought into their closed position. When the both roof components are moved to their open position, the front side of the package tray with respect to the vehicle is guided by the support surface toward the lower side of the storage space to be housed in it.

According to another aspect of the invention, the structure is configured such that at least one of the guide member and the package tray is provided with a biasing means for biasing the package tray at the front side thereof toward the support surface of the guide member. It is prevented that the front side of the package tray with respect to the vehicle leaves the support surface of the guide member so that it will be enabled to exactly guide the package tray through the support surface.

According to a further aspect of the invention, the structure is configured such that an engaging portion is provided in the package tray at the front side thereof with respect to the vehicle and the guide member is installed on the upper front side of the storage space having a recess into which the engaging portion is inserted for making an engagement therewith, and the recess extends downwards so as to guide the package tray at the front side thereof into the lower side of the storage space, when the upper roof component and the rear roof component are moved from their closed position to their open position.

The engaging portion of the package tray is engaged with the recess in the guide member and the front side of the package tray with respect to the vehicle is supported by the guide member when the upper roof component and the rear roof component are brought to their closed position. Furthermore, when both roof components are moved to their open position, the engaging portion of the package tray travels through the recess in accordance with its shape to the lower side of the storage space, thereby the front side of the package tray is guided to the lower side of the storage space.

According to yet another aspect of the invention, the structure is configured such that the rotary mechanism is arranged in the package tray at the rear end thereof so that the package tray is rotated about its rear end.

According to another feature of the invention of claim 6, the rotary mechanism is arranged in the package tray at an intermediate location thereof with respect to the longitudinal direction of the vehicle. According to the structure, the package tray can be easily folded at the intermediate location thereof when the package tray is guided by the guide member.

According to the invention the rear side of the package tray is coupled with the rear roof component, the package tray is stored into the storage space by the storing movement of the rear roof component and the guide member is provided for rotating at least a front portion of the package tray relative to the rear roof component in order to prevent the package tray from interfering with the movement of the roof components during storing process, and thereby the package tray is prevented from interfering with the movement of the roof components without installing an electric motor or the like as in the conventional roof. Owing to the invention, a structure for operating the package tray can be simplified to realize a cost reduction, and a sufficient space for the vehicle and luggage compartments can be secured since a space for an electric motor or the like is not required.

The front side of the package tray can be supported from the beneath by the support surface of the guide member, when the roof components are in their closed position, and the front side of the package tray can be guided to the lower side of the storage space. It is, thus, possible to prevent the package tray from interfering with the traveling of the roof components in spite of such a simple structure that the guide member is provided only with a support surface.

According to the invention, the front side of the package tray is biased against the support surface of the guide member. Thus, it is impossible to guide the package tray as intended and surely avoid it from interfering with the traveling of the roof components.

In accordance with the invention, an engaging portion of the package tray is engaged with a recess of the guide member so as to support the front side of the package tray with respect to the vehicle, when the roof components are in their closed position. By way of the recess, the front side of the package tray can be guided to the lower side of the storage space. It is, thus, possible to prevent the package tray from interfering with the traveling of the roof components in spite of such a simple structure that the guide member is provided only with a recess extending downward.

According to the invention, a rotary mechanism is arranged in the package tray at the rear end thereof with respect to the vehicle. Thereby, it is possible to rotate the whole package tray relative to the rear roof component when the package tray is guided by the guide member.

By arranging the rotary mechanism in the package tray at an intermediate location thereof with respect to the longitudinal direction of the vehicle, it is possible to fold the package tray when it is guided by the guide member. Thus, the package tray can be easily guided, corresponding to the movement of the roof components and the geometry of the storage space.

Embodiments of the present invention will be hereinafter described in detail with reference to the accompanying drawings.

DETAILED DESCRIPTION OF THE INVENTION

Incidentally, for ease of explanation, the front and rear sides of vehicle are referred to simply as the "front" and "rear," respectively, in descriptions of these embodiments and are with respect to the longitudinal direction of the vehicle.

Figure 2:
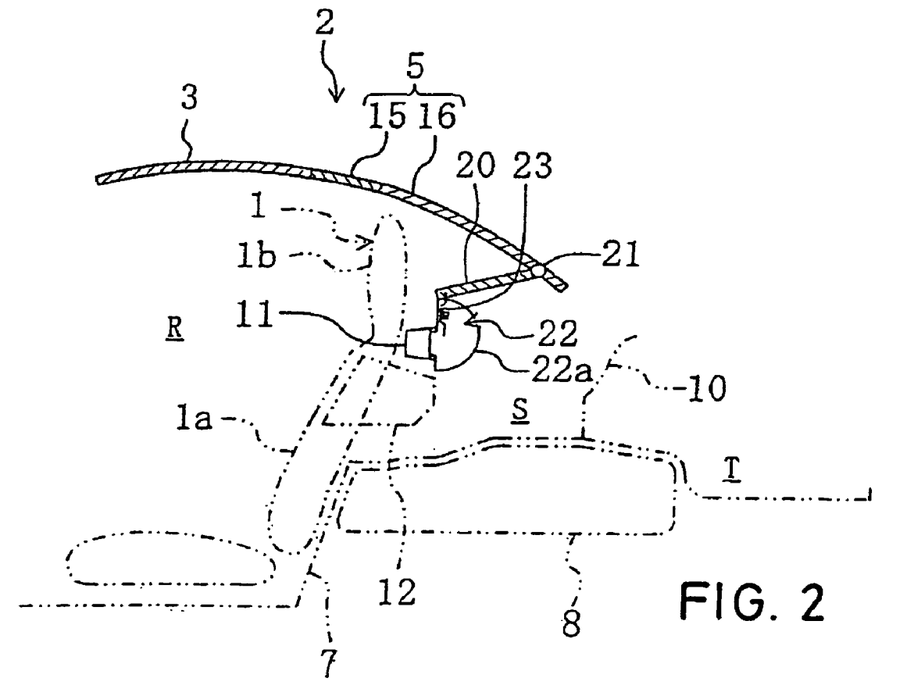
FIG. 2 is a schematic view of the rear of a vehicle showing a state in which its roof is in a closed position and covers over the compartment.

FIG. 2 illustrates a roof storage structure related to an embodiment of the present invention in which a vehicle provided with this roof storage structure is a passenger car, a interior compartment R thereof is provided with a driver seat 1 and a front passenger seat 1 (the seat shown in each drawing can be considered to be either the driver seat or the front passenger seat). A roof 2 of this vehicle is constructed to be capable of opening and closing, and comprises an upper roof component 3 overlying the seat 1 of the interior compartment R and a rear roof component 5 which is connected with the rear edge of the upper roof component 3 to cover the rear of the compartment R.

On the other hand, the front of a floor panel 7 of the vehicle extends nearly horizontally, and the seat 1 is installed on the upper surface of the front of this floor panel 7. The space for allocating a storage box, a fuel tank 8 and the like is reserved with a narrow margin below the floor panel 7, thereby the rear of the floor panel 7 extends rearward after extending upward along the rear surface of seat back 1a of the seat 1 corresponding to the layout below the floor panel 7. Both edges in the vehicle width direction and the rear edge of the rear of this floor panel 7 are provided with side walls and a rear wall (not shown) respectively, and the upper side of the rear of the floor panel 7 is enclosed with the seat back 1a, by side walls in the vehicle width direction and a rear wall. A panel material 10 is provided at middle location of the floor panel 7 in the anterior-posterior direction and extends upward; a storage space S for housing the roof components 3, 5 is formed in the position in front of panel material 10, and a luggage compartment T is formed rearward thereof.

Moreover, a reinforcing member 11 is installed immediately behind the seat 1 of the vehicle. The reinforcing member 11 is a stick or bar that extends nearly straight between the vicinities of both side edges in the vehicle width direction and is positioned at a level corresponding to the proximity of the upper edge of the panel material 10. Furthermore, an articles accommodating box 12, which can be opened forward is provided between the driver and front passenger seats 1. The rear of this articles accommodating box 12 projects into the storage space S so as to obtain a maximum capacity within a limited space.

On the other hand, the upper roof component 3 is a panel stretching nearly horizontally in the anterior-posterior direction when it is in a closed position, and the rear edge thereof is positioned forward of a headrest 1b of the seat 1. The rear roof component 5 comprises an intermediate roof part 15 and a back window 16. When it is in a closed position, the intermediate roof part 15 extends rearward from the rear edge of the upper roof component 3. The length of this intermediate roof part 15 in the anterior-posterior direction is made shorter than that of the upper roof component 3, and its ends in the vehicle width direction extend downward to be connected with both side walls of the vehicle. When it is in a closed position, the back window 16 is inclined rearward and downward from the rear edge of the intermediate roof part 15, and the rear edge of this back window 16 is located over the intermediate portion of the storage space S in the anterior-posterior direction. It is also possible to form the rear roof component 5 by integrating the intermediate roof part 15 with back window 16.

Figure 1:
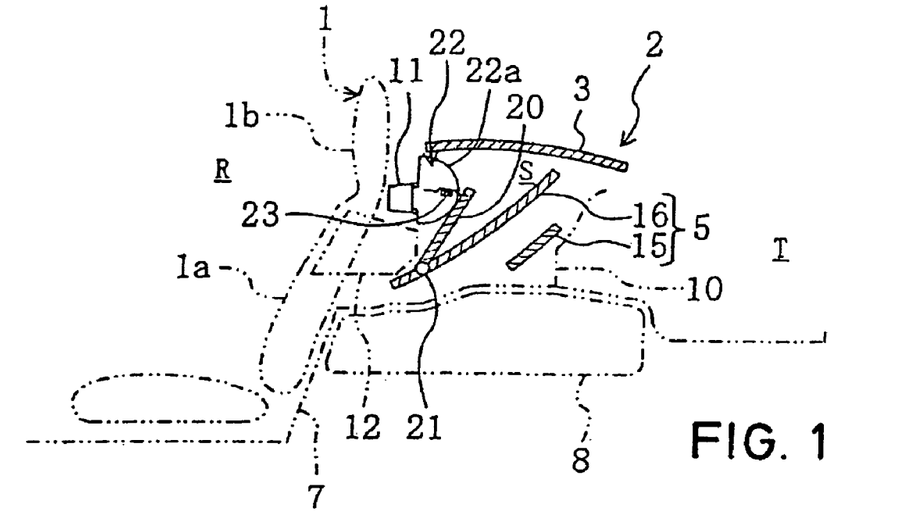
FIG. 1 is a schematic view of the rear of a vehicle showing a state in which its roof is in an open position and housed in a storage space.

The upper roof component 3, intermediate roof part 15 and back window 16 are coupled to each other by linkages, etc. and are supported on the vehicle by support arms (not shown). As for these linkages and support arms, those having the structure know disclosed in, e.g., Japanese Unexamined Patent Publication No. 2003-237375and corresponding U.S. Pat. No. 6,871,901may be utilized, and said U.S. patent is hereby incorporated by reference. The upper roof component 3 and the rear roof component 5 can be switched between their closed position as explained above and an open position wherein they are housed in the storage space S and the interior compartment R is opened up as shown in FIG. 1 by activating the support arm using an actuator and the like fixed on the vehicle (not shown).

Furthermore, the vehicle is provided with a rear shelf, package tray 20, which is disposed above the storage space S when the upper roof component 3 and the rear roof component 5 are in their closed position. This package tray 20 is produced, e.g., by molding resin material into a flat panel and is configured and arranged so as to extend from the rear edge of the back window 16 to the vicinity of the upper end of the reinforcing member 11 when the roof components 3, 5 are in their closed position, as shown in FIG. 2. Moreover, this package tray 20 is housed in the storage space S together with the roof components 3, 5, when they are moved into their open position, as shown in FIG. 1.

The rear edge of the package tray 20 is provided with a rotating mechanism 21 comprising hinges, etc., having a rotation axis which extends in the vehicle width direction in the vicinity of the rear edge of the package tray 20, and the package tray 20 is fitted to the back window 16 by way of the rotating mechanism 21. Consequently, the package tray 20 rotates in directions such that its top surface moves toward and away from the inner surface of the back window 16. Any type of rotating mechanism 21 will do if it has a rotation axis extending in the vehicle width direction, and it is, thus, not limited to a hinge only.

Moreover, a pair of guide members 22 is provided at the anterior-superior portion of the storage space S, spaced apart each from other in the vehicle width direction. The guide members 22 guide the package tray 20 during its retraction into the storage space S. Both guide members 22 have the same structure, being made of roughly semicircular plate material of which the front half is cut off in a lateral view, and is fixed to the reinforcing member 11. One or more than three guide members 22 may be used, and in the case of only one, it can be placed at the middle in the vehicle width direction. It is also possible that this guide member 22 is fixed to parts other than the reinforcing member 11.

The underside of the front edge of the package tray 20, in a closed position as mentioned above, is in contact with/supported by a support surface 22a comprising an end face which extends downward in the form of a segment of a circle from the upper edge through the rear edge to the lower edge of the guide member 22. Moreover, the underside of the front edge of the package tray 20 is configured to come into a sliding contact with the support surface 22a when it is housed in storage space S. More specifically, a travel path of the package tray 20 is to be determined by the support surface 22a of the guide member 22, and in this embodiment, the shape of the support surface 22a is so defined that the traveling package tray 20 does not touch the roof components 3, 5, articles accommodating box 12, etc., and thus, does not interfere with the retracting movement of the roof components 3, 5.

The guide member 22 is provided with a coil spring 23 as a biasing means which biases the underside of the front edge of the package tray 20 against the support surface 22a of the guide member 22. One end of this spring 23 is fitted to the front edge of the guide member 22, whereas the other end is fitted to the front edge of the package tray 20. As for the biasing means, any type will do so long as the front of the package tray 20 is biased against the support surface 22a, and a rubber member or the like, for example, can be utilized.

Figure 3:
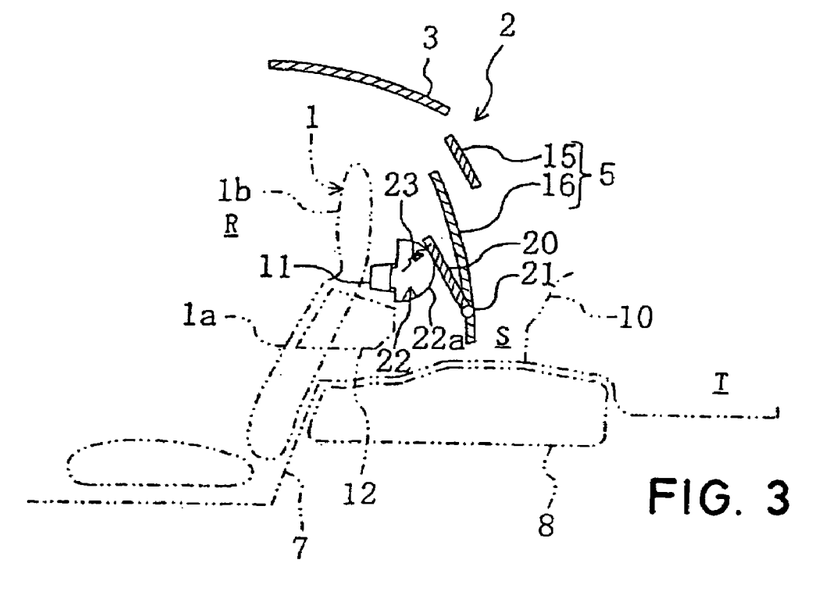
FIG. 3 is a schematic view of the rear of a vehicle showing a state in which its roof is in-between closed and open positions.

The following is an explanation about the roof components 3, 5 when they are moved from their closed position shown in FIG. 2 to their open position shown in FIG. 1. When the support arm is activated by an actuator of the vehicle, the upper roof component 5 moves via the linkage upward and backward, the intermediate roof part 15 moves backward as a whole with its rear end inclined downward, and the back window 16 rotates such that its rear travels widely downward around the area of the front edge and approaches the guide member 22, as shown in FIG. 3. Since the package tray 20 is mounted on the back window 16, its rear moves widely downward due to the traveling of the back window 16. Because the package tray 20 is provided with the rotating mechanism 21 and the front edge of the package tray 20 is biased against the support surface 22a of the guide member 22 to be guided by the support surface 22a, the front of the package tray 20 rotates relative to the back window 16 and the front is guided downward sliding on the support surface 22a.

As shown in FIG. 1, when the upper roof component 3 and the rear roof component 5 move to their open position, the intermediate roof part 15 is retracted into the posterior-interior area of the storage space S, and the back window 16 also moves away from the intermediate roof part (15) upward and forward to be housed into the storage space S. When the back window 16 is housed in storage space S, its part connected with the package tray 20 lies at the lower front area of the storage space S, so that the rear edge of the package tray 20 is also positioned close to the lower front area of the storage space S. Then, the upper roof component 3 moves upward over the storage space S, and the storage space S is, thus, covered by the upper roof component 3.

Consequently, according to this embodiment, the rear end of the package tray 20 is provided with the rotating mechanism 21, the package tray 20 is installed on the back window 16 by way of the rotating mechanism 21, and the package tray 20 is guided with at least at its front by the guide member 22 such that the package tray 20 does not interfere with the movement of the roof components 3, 5 during their traveling from the closed position to the open position. As a result, it is possible to retract the package tray 20 into the storage space S for preventing the traveling of the roof components 3, 5 from being interfered without using a conventional electric motor etc. Therefore, a simplified structure for activating the package tray 20 can be realized with reduced cost, and the interior compartment R and luggage compartment T can be widely configured since it is not necessary to allocate any space for an electric motor or the like.

In addition, the package tray 20 is supported by the upper end of the support surface 22a which is formed on the guide member 22 and extends downward, and guided up to the storage space S by means of the support surface 22a when the roof components 3, 5 are in their closed position. It is, thus, possible to prevent the package tray 20 from interfering with the traveling of the roof components 3, 5, in spite of such a simple structure that the guide member 22 is provided only with support surface 22a.

Moreover, the front edge of the package tray 20 is biased against the support surface 22a of the guide member 22 with a spring 23, so that it is, thus, possible to prevent the package tray 20 from leaving the support surface 22a. Accordingly, it is possible to guide the package tray 20 as intended and ensure that it does not interfere with the traveling of the roof components 3, 5.

Since the rotating mechanism 21 is fitted on the rear edge of the package tray 20, it is also possible to rotate the whole package tray 20 by merely guiding its front edge using the guide member 22.

Figure 4:
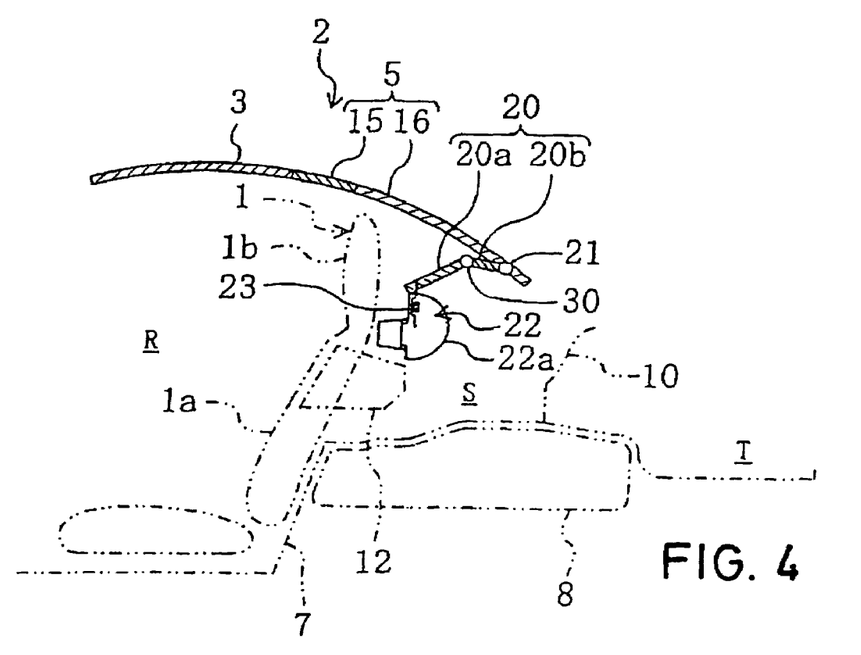
FIG. 4 is a view corresponding to FIG. 2 related to a first alternative example.
Figure 5:
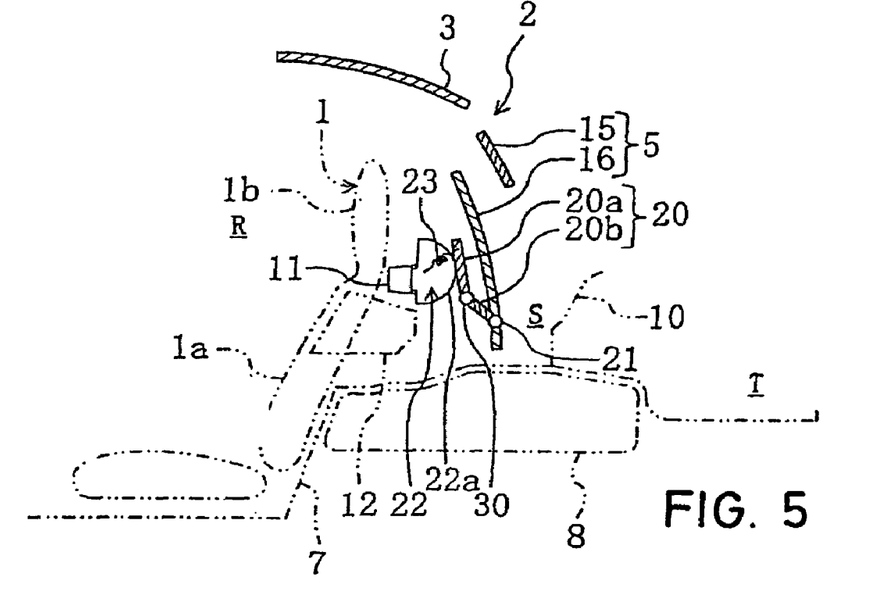
FIG. 5 is a view corresponding to FIG. 3 related to the first alternative example.
Figure 6:
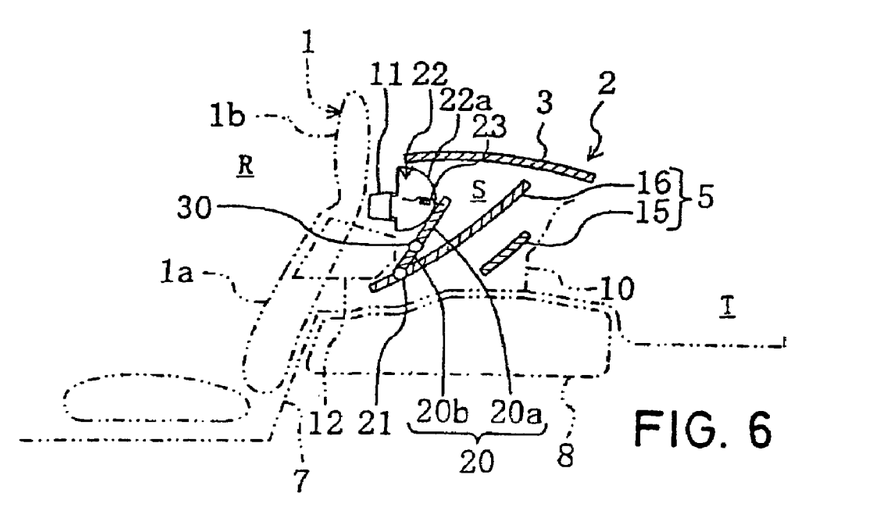
FIG. 6 is a view corresponding to FIG. 1 related to the first alternative example.

In accordance with an alternative embodiment, shown in FIGS. 4-6, around the middle of the package tray 20 in the anterior-posterior direction is provided a rotating mechanism 30 with a rotation axis extending in the vehicle width direction. In this case, the package tray 20 wholly rotates via a rotating mechanism 21 fitted on its rear edge, and a front part 20a, located anterior to the rotating mechanism 30, rotates relative to a rear part 20b via the rotating mechanism 30 of the intermediate part, thereby the package tray 20 can be folded.

In this alternative embodiment, when the upper roof component 3 and the rear roof component 5 are in their closed position, the package tray 20 will be folded so that the rotating mechanism 30 of the intermediate part is placed in its upper position, as shown in FIG. 4. During the traveling from this closed position to the open position, the package tray 20 will be folded to the opposite side, compared to the closed position to obtain a sufficient clearance between the inner surface of the back window 16 and the package tray 20, as shown in FIG. 5. Furthermore, when the roof components 3, 5 reach their open position, the package tray 20 will become nearly flat to be housed into the storage space S, as shown in FIG. 6.

In this way, providing the intermediate part of the package tray 20 with the rotating mechanism 30 enables the package tray 20 to be folded when it is guided. Thereby design freedom of the traveling path of the package tray 20 is increased, and the package tray 20 can be easily guided, corresponding to the movement of the roof components 3, 5 and the geometry of the storage space S.

Figure 7:
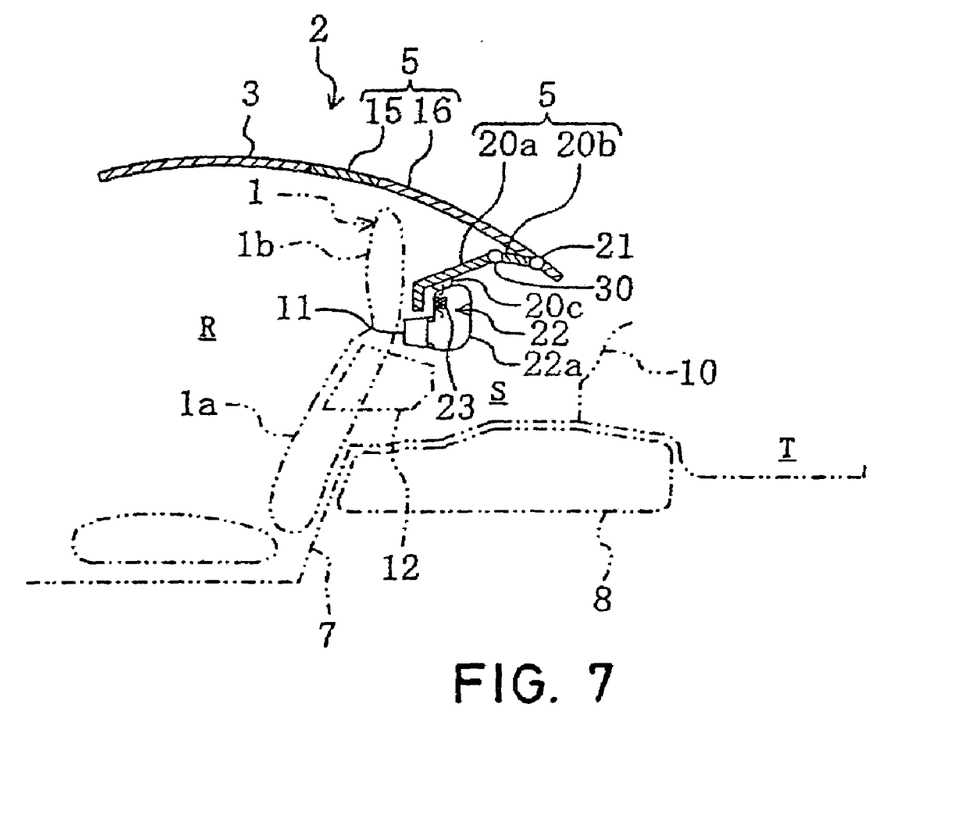
FIG. 7 is a view corresponding to FIG. 2 related to a second alternative example.
Figure 8:
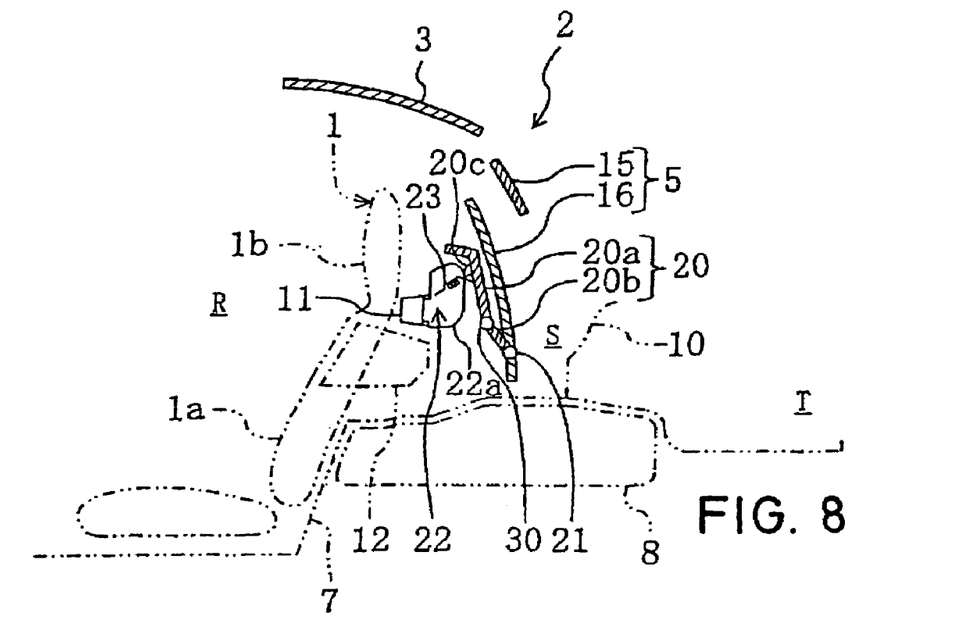
FIG. 8 is a view corresponding to FIG. 3 related to the second alternative example.
Figure 9:
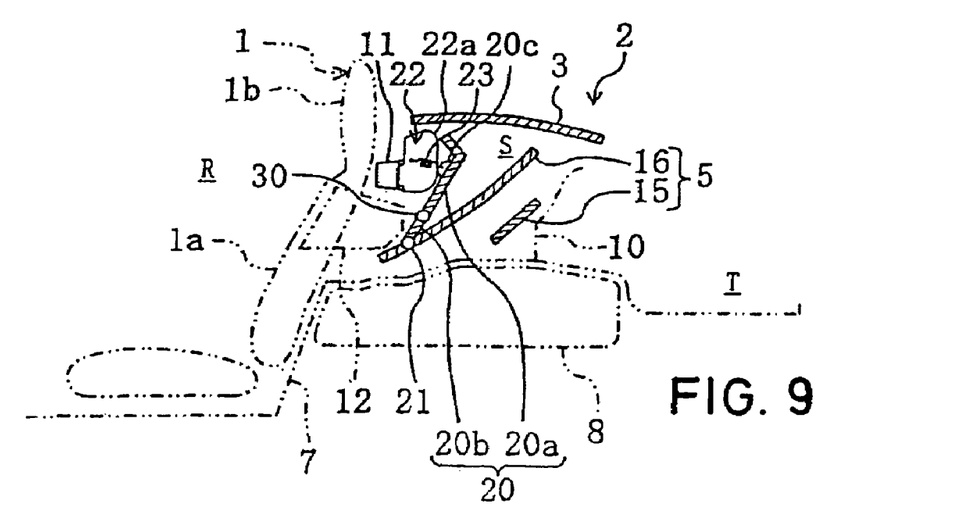
FIG. 9 is a view corresponding to FIG. 1 related to the second alternative example.

The guide member 20 may take a shape other than semicircle from a lateral view as in alternative embodiment 2 shown in FIGS. 7 & 8. In this alternative embodiment, the upper edge of the support surface 22a of the guide member 22 is formed so as to extend upward with a curve, and its rear edge is shaped so as to extend roughly straight upward and downward. Moreover, the package tray 20 is provided with a rotating mechanism 30 similar to the alternative embodiment 1. In this alternative embodiment 2, a projection 20c is formed on the undersurface of front edge of the package tray 20 so that the outer surface of this projection 20c touches a support surface 22a of the guide member 22.

In this way, the traveling path of the package tray 20 during guiding can be easily modified by merely changing the shape of the support surface 22a of the guide member 22 and that of the part contacting the support surface 22a of the package tray 20.

In addition, it is also possible to guide the package tray 20 by mounting a hook member 40 as an engaging part onto the front edge of the package tray 20 and engaging the hook member 40 with a recess 22b formed in the guide member 22, as in the alternative embodiment 3 shown in FIGS. 10(a)

Figure 10:
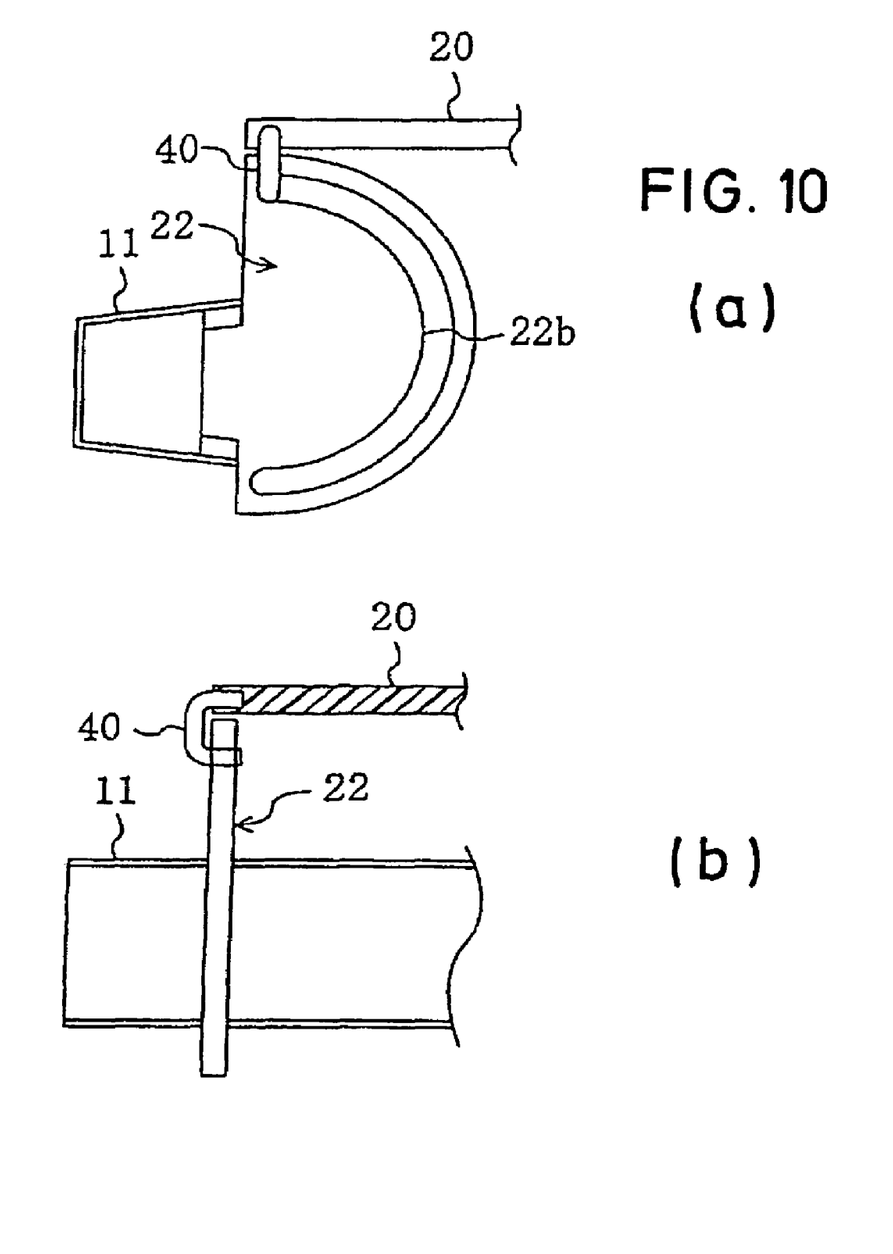
FIG. 10(a) is an enlarged side elevational view showing the proximity of a guide member and FIG. 10(b) is an enlarged elevational view showing the proximity of a guide member, related to a third alternative example.

& 10(*b*). As shown in FIG. 10(*b*), the hook member 40 is formed into a roughly U-shape with an opening toward the inner side in the vehicle width direction, and one end of this hook member 40 is inserted in/held on an inward end of the package tray 20 in the vehicle width direction. This hook member 40 projects inward in the vehicle width direction at the undersurface side of the package tray 20. It may be also allowed that the hook member 40 projects outward in the vehicle width direction.

Besides, the recess 22*b* of the guide member 22 extends downward from the proximity of the upper edge of the guide member 22 to the vicinities of its rear and lower edges in the form of a segment of a circle. When the package tray 20 is retracted, the hook member 40 moves through the recess 22*b* to guide the package tray 20. The shape of this recess 22*b* is so defined that the traveling package tray 20 does not contact the roof components 3, 5, articles accommodating box 12, etc., and does not interfere with the retracting movement of the roof components 3, 5.

In this alternative embodiment 3, the hook member 40 is engaged in the recess 22*b* when the roof components 3, 5 are in their closed position, and the front edge of the package tray 20 is, thus, supported by the guide member 22 via the hook member 40. Although not illustrated, the hook member 40 travels to the downside of the storage space S through the recess 22*b* by moving the roof components 3, 5 to their open position, thereby the package tray 20 is guided toward the downside of the storage space S.

Figure 11:
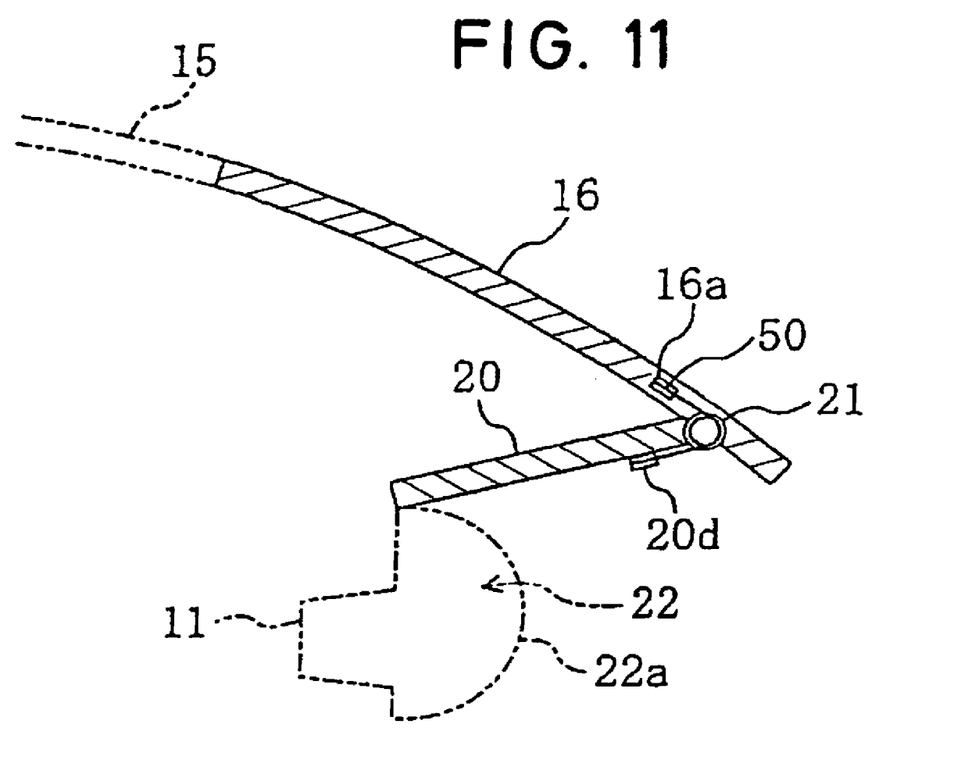
FIG. 11 is an enlarged view showing the proximity of a package tray in FIG. 2 related to a fourth alternative example.

Incidentally, though the biasing means 23 is composed of a coil spring, the biasing means is not limited thereto and may be another structure, for example, the package tray 20 can be provided with a helical spring 50 which biases the front of the package tray 20 against the support surface 22*a* of the guide member 22 and this helical spring 50 is defined as a biasing means in the alternative embodiment 4 shown in FIG. 11. The reference numerals and symbols 20*d* and 16*a* shown in FIG. 11 represent engaging portions at which the ends of the helical spring 50 are engaged.

Additionally, though the guide member 20 is composed of plate material in this embodiment, it is not limited to that and may be made of a pillar piece extending in the vehicle width direction.

Furthermore, even though the storage space S and luggage compartment T are partitioned by panel material 10 allocated behind the floor panel 7, it is also possible to couple the storage space S to the luggage compartment T by omitting the panel material 10.

Moreover, though the invention has been described relative to a two-seater passenger car, the present invention is also applicable to one-seater and to those having more than two seats.

INDUSTRIAL APPLICABILITY

As described above, the vehicle roof storage structure according to the present invention is applicable to, e.g., a vehicle with a retractable roof divided into three sections.

What is claimed is:

1. A storable vehicle roof structure, comprising:
   an upper roof component for covering an area above seats in a vehicle interior compartment,
   a rear roof component coupled to the upper roof component to be located at a rear side thereof so as to cover a rear portion of the vehicle interior compartment, and
   a package tray,
   wherein the upper roof component and the rear roof component are operatively configured to be movable between a closed position in which the components cover the vehicle interior compartment and an open position where the components are stored in a storage space arranged in an area behind seats of the vehicle interior compartment for exposing the vehicle interior compartment,
   wherein the package tray is arranged to cover a top side of the storage space when the upper roof component and the rear roof component are in the closed position,
   wherein the package tray is operatively coupled at a rear side with the rear roof component so as to be stored in the storage space by a storing motion of the rear roof component;
   wherein the package tray is provided with a rotary mechanism for rotating at least a front portion of the package tray relative to the rear roof component about an axis extending in a width direction of the vehicle; and
   wherein a fixed guide member is provided for rotating and guiding at least a front side of the package tray about the axis of the rotary mechanism, the front side of the package tray being guided along a downwardly extending curved path by said fixed guide member, so as to prevent the package tray from interfering with the movement of the upper roof component and the rear roof component when they are moved from the closed position to the open position.

2. The storable vehicle roof structure according to claim 1, wherein:
   the guide member is disposed in the storage space at an upper front side thereof and has a support surface for supporting the package tray from beneath at a front side thereof when the upper roof component and the rear roof component are in their closed position, and
   the support surface extends downward so as to come into contact with the package tray at the front side thereof and to guide it into the lower side of the storage space, as the upper roof component and the rear roof component are moved from their closed position to their open position.

3. The storage structure of a vehicle roof according to claim 2, wherein at least one of the guide member and the package tray is provided with a biasing means for biasing the package tray, at the front side thereof, toward a support surface of the guide member.

4. A storable vehicle roof structure, comprising:
   an upper roof component for covering an area above seats in a vehicle interior compartment,
   a rear roof component coupled to the upper roof component to be located at a rear side thereof so as to cover a rear portion of the vehicle interior compartment, and
   a package tray,
   wherein the upper roof component and the rear roof component are operatively configured to be movable between a closed position in which the components cover the vehicle interior compartment and an open position where the components are stored in a storage space arranged in an area behind seats of the vehicle interior compartment for exposing the vehicle interior compartment,
   wherein the package tray is arranged to cover a top side of the storage space when the upper roof component and the rear roof component are in the closed position,
   wherein the package tray is operatively coupled at a rear side with the rear roof component so as to be stored in the storage space by a storing motion of the rear roof component;

wherein the package tray is provided with a rotary mechanism for rotating at least a front portion of the package tray relative to the rear roof component about an axis extending in a width direction of the vehicle;

wherein a guide member is provided for rotating and guiding at least a front side of the package tray about the axis of the rotary mechanism so as to prevent the package tray from interfering with the movement of the upper roof component and the rear roof component when they are moved from the closed position to the open position, wherein an engaging portion is provided in the package tray at the front side thereof and wherein a recess is provided into which the engaging portion is engageable; and wherein the recess extends downward so as to guide the package tray at the front side thereof into a lower side of the storage space when the upper roof component and the rear roof component are moved from their closed position to their open position.

5. The storage structure of a vehicle roof according to claim 4, wherein the rotary mechanism is arranged in the package tray at a rear end thereof.

6. The storage structure of a vehicle roof according to claim 4, wherein a second rotary mechanism is arranged in the package tray at an intermediate location thereof with respect to the longitudinal direction of the vehicle, the package tray being foldable about said second rotary mechanism.

7. The storage structure of a vehicle roof according to claim 1, wherein the rotary mechanism is arranged in the package tray at a rear end thereof.

8. A storable vehicle roof structure, comprising:

an upper roof component for covering an area above seats in a vehicle interior compartment, a rear roof component coupled to the upper roof component to be located at a rear side thereof so as to cover a rear portion of the vehicle interior compartment, and a package tray, wherein the upper roof component and the rear roof component are operatively configured to be movable between a closed position in which the components cover the vehicle interior compartment and an open position where the components are stored in a storage space arranged in an area behind seats of the vehicle interior compartment for exposing the vehicle interior compartment, wherein the package tray is arranged to cover a top side of the storage space when the upper roof component and the rear roof component are in the closed position, wherein the package tray is operatively coupled at a rear side with the rear roof component so as to be stored in the storage space by a storing motion of the rear roof component;

wherein the package tray is provided with a rotary mechanism for rotating at least a front portion of the package tray relative to the rear roof component about an axis extending in a width direction of the vehicle; and wherein a guide member is provided for rotating and guiding at least a front side of the package tray about the axis of the rotary mechanism so as to prevent the package tray from interfering with the movement of the upper roof component and the rear roof component when they are moved from the closed position to the open position, wherein a second rotary mechanism is arranged in the package tray at an intermediate location thereof with respect to the longitudinal direction of the vehicle, the package tray being foldable about said second rotary mechanism.

9. The storage structure of a vehicle roof according to claim 1, wherein the rear roof component comprises an intermediate roof part and a back window.

* * * * *